United States Patent

Trackwell et al.

Patent Number: 5,921,552
Date of Patent: *Jul. 13, 1999

[54] EMISSION CONTAINMENT AND ALIGNMENT APPARATUS AND METHOD FOR FLUID SYSTEMS

[75] Inventors: Fred W. Trackwell, Houston; Joe King, Sea Brook, both of Tex.

[73] Assignee: A & A Environmental Seals, Inc., La Marque, Tex.

[ * ] Notice: This patent is subject to a terminal disclaimer.

[21] Appl. No.: 08/611,147

[22] Filed: Mar. 5, 1996

Related U.S. Application Data

[63] Continuation-in-part of application No. 08/193,256, Feb. 8, 1994, Pat. No. 5,516,119.

[51] Int. Cl.⁶ ............................................. F16J 15/54
[52] U.S. Cl. ..................... 277/350; 277/351; 277/412; 277/422; 277/928
[58] Field of Search .................... 277/350, 351, 277/411, 412, 422, 928

[56] References Cited

U.S. PATENT DOCUMENTS

| Re. 34,923 | 5/1995 | Ruesch | 277/17 |
|---|---|---|---|
| 1,323,474 | 12/1919 | Hodgkinson | 277/174 |
| 3,001,385 | 9/1961 | Allen | 277/174 |
| 3,514,167 | 5/1970 | Wahl, Jr. | 277/15 |
| 3,532,444 | 10/1970 | Strub | 277/15 |
| 3,670,850 | 6/1972 | Swearingen | 277/15 |
| 3,887,197 | 6/1975 | Kapich et al. | 277/15 |
| 4,087,097 | 5/1978 | Bossens et al. | 277/3 |
| 4,245,844 | 1/1981 | Pohl et al. | 277/3 |
| 4,500,093 | 2/1985 | Kapich | 277/15 |
| 4,500,693 | 2/1985 | Lesiecki et al. | 277/17 |
| 4,516,480 | 5/1985 | Cattaneo | 277/174 |
| 4,560,173 | 12/1985 | Adams et al. | 277/15 |
| 4,586,830 | 5/1986 | Carter | 277/3 |
| 5,035,436 | 7/1991 | Rockwood et al. | 277/70 |
| 5,165,699 | 11/1992 | Shrontz et al. | 277/135 |
| 5,203,370 | 4/1993 | Block et al. | 277/17 |
| 5,277,545 | 1/1994 | De Lange | 415/168.1 |
| 5,346,361 | 9/1994 | Jurgill et al. | 277/3 |
| 5,372,352 | 12/1994 | Smith et al. | 251/214 |
| 5,451,140 | 9/1995 | Johnson, Jr. et al. | 415/168.2 |
| 5,516,119 | 5/1996 | Trackwell et al. | 277/3 |

FOREIGN PATENT DOCUMENTS

WO 92/12366   7/1992   United Kingdom .

OTHER PUBLICATIONS

Advertisement Brochure entitled "SpiralTrac—Seal Protection in a Throat Bushing" by EnviroSeal, Jan. 1996.
Technical specification entitled "Jet Pump Technical Data Pumping Gases" by Penberthy, Section 1000, Bulletin 1300, Sep. 1987.
Technical specification entitled "Jet Pump Technical Data Heating Liquids", by Penberthy, Section 1000, Bulletin 1400, Jun. 1987.
Technical specification entitled "Jet Pump Technical Data Mixing Liquids" by Penberthy, Section 1000, Bulletin 1401, Sep. 1987.
Technical specification entitled "The PSS Dura Seal" by Durametallic Corporation, 1990.
Technical specification entitled "The SL–Series Dura Seal" by Durametallic Corporation, 1990.
Technical specification entitled, "The RO Dura Seal" by Durametallic Corporation, 1988.
Technical specification entitled, "the HSC Dura Seal" by Durametallic Corporation, 1991.
Technical specification entitled "The HSI Dura Seal" by Durametallic Corporation, 1986.

(List continued on next page.)

Primary Examiner—James R. Brittain
Assistant Examiner—John L. Beres
Attorney, Agent, or Firm—Tobor, Goldstein & Healey, L.L.P.

[57] ABSTRACT

An emission containment apparatus and method for use in a fluid system having a chamber housing and a shaft.

19 Claims, 6 Drawing Sheets

OTHER PUBLICATIONS

Technical specification entitled "The HSS Dura Seal for High Speed Services" by Durametallic Corporation, 1985.

Technical specification entitled "The MSS Dura Seal" by Durametallic Corporation, 1988.

Technical specification entitled "The Cartridge SB–200 Dura Seal" by Durametallic Corporation, 1992.

Technical specification entitled "Welded Metal Bellows Seals" by EG&G Sealol.

Technical specification entitled "Extended Performance Emission Containment Seals" by EG&G Sealol.

Technical specification entitled "Effective Solutions for Meeting Emissions Regulations" by EG&G Sealol.

Catalog entitled "Vortec—An Illinois Tool Works Company" by Vortec Corporation, 1992.

Quick Reference Guide entitled "O–Ring Reference Guide" by Parker Seals, 1991.

Brochure entitled "The X–Series Cartridge Mounted Dura Seal" by Durametallic Corporation, 1987.

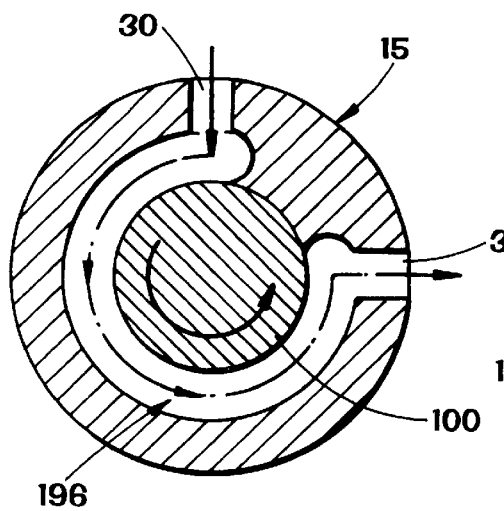
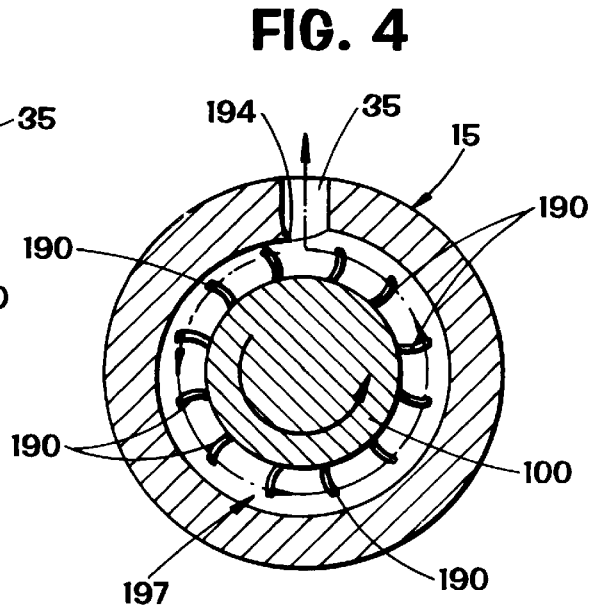
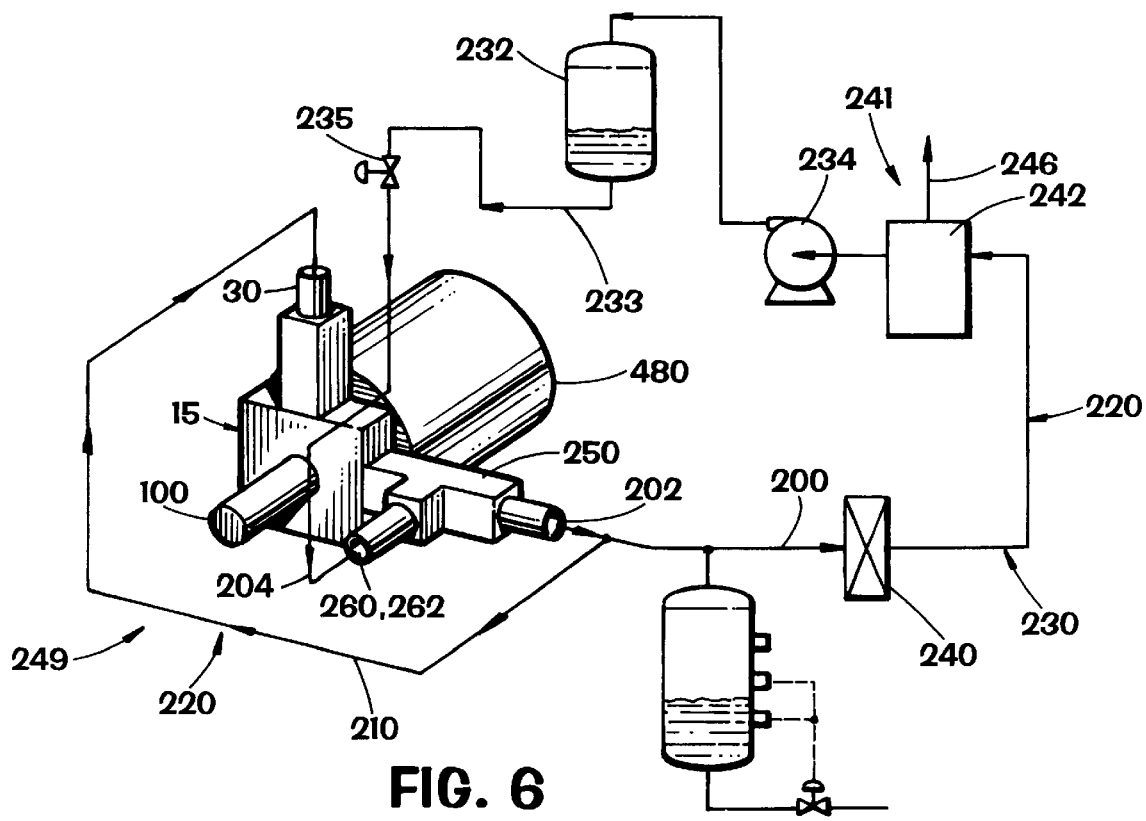

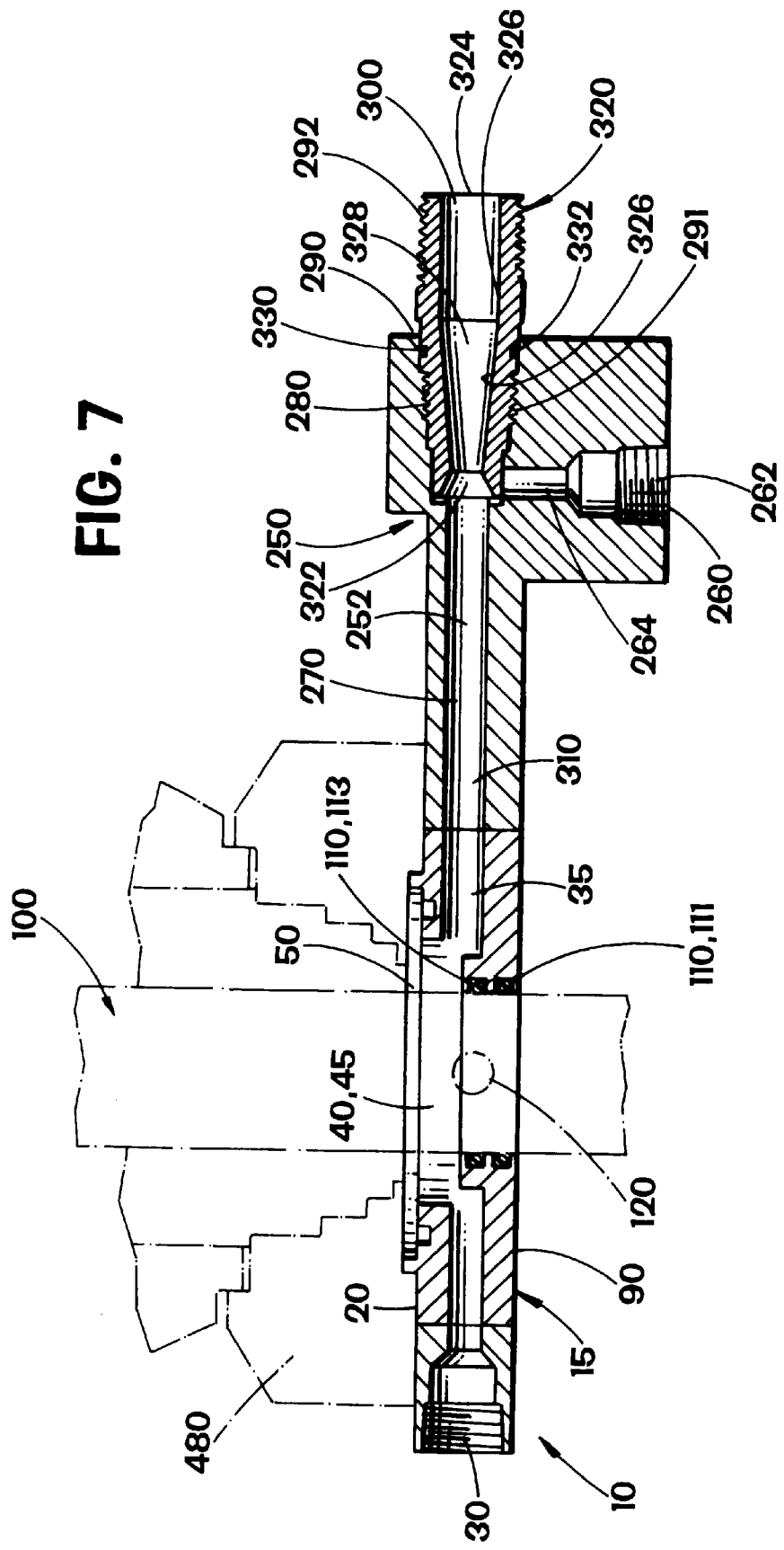

EMISSION CONTAINMENT AND ALIGNMENT APPARATUS AND METHOD FOR FLUID SYSTEMS

RELATED APLLICATION

This application is a continuation-in-part application of application Ser. No. 08/193,256, filed Feb. 8, 1994, U.S. Pat. No. 5,516,119, issued May 14, 1996, entitled "A Vapor Containment and Recirculation Device".

BACKGROUND OF THE INVENTION

1. Field of the Invention

The invention relates to emission containment and alignment apparatus and method for fluid systems, including pumps and valves.

2. Description of the Prior Art

Fluid systems and their components, such as pumps and valves, comprise mechanically moving parts. In order for such parts to move with respect to each other, there must be some degree of clearance between them. This clearance provides a flowpath for fluid to escape.

Prior devices have used compression packing as a primary seal for the system. Such systems may incorporate packing followers to apply pressure to the seal. Such systems are durable and are particularly suited for use in abrasive services. However, there may be a number of disadvantages in using compression packing in certain applications, such as where volatile organic compounds (hereinafter "VOC's") are involved. Use of compression packing, alone, has not proved effective in eliminating or reducing to desired amounts the level of VOC emissions. Conventional packing follower systems typically allow product leakage to the atmosphere along both the inside diameter and outside diameter of the compression packing, and do not provide for shaft misalignment during installation. Typical use of compression packing may also lead to excessive wear of all contacting parts causing a reduction in the packing estimated sealing life as well as decreasing the overall efficiency of the system. Further, compression packing typically requires the use of lubrication to maintain the effectiveness of the seal. Prior systems may leak down the shaft, through a pump stuffing box outside diameter, through any split of the packing follower, or through other means. Conventional packing follows systems typically involve manually installing individual units of compression packing within a stuffing box. Such installation may be subject to installation error and it may be difficult to effectively place the compression stuffing within the stuffing box.

It may be desirable that emission containment systems be aligned very near the center line of the pump shaft. Prior systems require the installer to visually align the emission containment gland, which may cause misalignment of the system with respect to the shaft, thereby causing damage to either or both of the shaft or the emission containment system, causing the system to lose efficiency, and reducing the expected life of the system. Prior sealing members may incorporate seals that require constant contact and pressure on the shaft, thus causing undue wear on the shaft and the seal thereby creating a gap whereby VOC's may not be contained.

Prior systems may have involved high maintenance costs, short life spans, and/or have been less than effective in reducing or eliminating VOC release into the atmosphere or inflow of fluid into the system. Accordingly, prior to the development of the present invention, there has been no apparatus and method for emission containment for use in fluid systems that provides efficient and effective sealing and alignment means used in connection with an emission containment system. Therefore, the art has sought an apparatus and method for emission containment for use in fluid systems that provides efficient and effective sealing and alignment means used in connection with an emission containment system.

SUMMARY OF THE INVENTION

In accordance with the invention, the foregoing advantages have been achieved through the present emission containment sealing and alignment apparatus and method for use in fluid systems, including pumps and valves, whereby an emission containment gland may be used in combination with sealing and alignment apparatus to provide efficient and effective sealing and alignment of the emission containment gland.

The present invention may include an emission containment device for use in a fluid system having a chamber housing and a shaft with a surface. The emission containment device may comprise a front face adapted to be disposed in communication with the chamber housing; a rear face, having a central bore with a periphery and having the shaft extending therethrough; a vapor outlet; and an arced vapor channel disposed in fluid communication with the vapor outlet, the periphery of the central bore, and the fluid system shaft whereby fluid traveling along the shaft must flow along an arced path.

The emission containment device may further comprise a sealing member disposed in sealing engagement with the shaft outboard of the arced vapor channel. The sealing member may be a tandem shaft seal, it may be a floating shaft seal, or it may be some other type of seal.

The emission containment device may include one or more blades adapted to be fixedly attached to or otherwise disposed along the surface of the shaft in fluid communication with the arced vapor channel and the vapor outlet, whereby, as the shaft rotates, the blades create a fluid flow in the arced vapor channel. The emission containment device may also include a duct, disposed in communication with the arced vapor channel path and proximate the vapor outlet, whereby the fluid traveling along the arced path will tend to flow through the vapor outlet. The device may also include a suction manifold disposed in fluid communication with the vapor outlet.

The emission containment device may further comprise a vapor inlet disposed in fluid communication with the arced vapor channel; a suction manifold attached to the vapor outlet and disposed in fluid communication with the arced vapor channel; and an arc barrier disposed along the arced vapor channel, intermediate the vapor inlet and the vapor outlet, whereby fluid traveling along the arced vapor channel tends to travel in one direction from the vapor inlet through the vapor outlet.

The emission containment device may be for use in a fluid system having a shaft with a surface, and may comprising a source of fluid pressure; an emission containment gland, having a conduit therethrough adapted to receive the shaft, and defining an inside diameter, a seal chamber provided along the inside diameter, and a gas injection channel disposed in the emission containment gland in fluid communication with the source of fluid pressure and the seal chamber; a solid seal ring, having a seal groove, disposed within the seal chamber; and an O-ring disposed within the seal groove and in sealing engagement with the shaft.

The emission containment device may further include a sealing member disposed in sealing engagement with the shaft outboard of the arced vapor channel; a floating shaft seal disposed in fluid communication with the shaft outboard of the arced vapor channel; or a tandem lip seal disposed in fluid communication with the shaft outboard of the arced vapor channel.

The emission containment device may further include a gland, having a gas injection channel therethrough, the gland including a front face adapted to be disposed in communication with the chamber housing; a rear face, having a conduit therethrough adapted to receive the shaft and defining an inside diameter and a periphery, and adapted to have the shaft extending therethrough; a vapor outlet; an arced vapor channel disposed in fluid communication with the vapor outlet, the periphery of the conduit, and the shaft; a source of fluid pressure in fluid communication with the gas injection channel; a solid seal ring, having a seal groove, adapted to be disposed within the seal chamber; and an O-ring disposed within the seal groove and adapted to be in sealing communication with the shaft.

An emission containment device for use in a fluid system having a chamber housing and a shaft with a surface, comprising a gland, having a gas injection channel therethrough, the gland including a front face disposed in communication with the chamber housing; the gland including a rear face, having a conduit therethrough receiving the shaft and defining an inside diameter and a periphery, and having the shaft extending therethrough; the gland having a vapor outlet; and the gland having an arced vapor channel disposed in fluid communication with the vapor outlet, the periphery of the conduit, and the shaft. The device may further comprise a source of fluid pressure in fluid communication with the gas injection channel; a solid seal ring, having a seal groove, disposed within the seal chamber; a shaft seal driving ring disposed within the seal groove and in communication with the shaft; and a floating shaft seal disposed in fluid communication with the shaft outboard of the arced vapor channel.

The present invention may further be directed towards a compression packing housing gland for use in a fluid system having a shaft with a diameter, comprising a plurality of compression packing rings having an inside diameter substantially equal to the shaft diameter to receive the shaft and having an outside diameter; a cylindrical cartridge barrel, having an inboard end and a conduit therethrough defining an inside diameter substantially equal to the packing ring outside diameter to receive the shaft and the plurality of compression packing rings; a retaining flange disposed proximate the inboard end of the cartridge barrel; and a follower flange disposed outboard the compression packing rings.

In another aspect, the present invention may be directed towards an emission containment device for use in a fluid system having a chamber housing with a conduit and having a shaft with a surface, comprising compression packing gland disposed within the chamber housing conduit, having a compression unit disposed therein; and an emission containment gland disposed outboard the compression packing gland and in sealing engagement with the compression packing gland. The device may further comprise a compression packing gland, having a compression unit disposed therein with an outboard surface, disposed within the chamber housing conduit; an alignment follower, having a conduit and an inboard surface, disposed outboard the packing gland and within at least a portion of the compression packing gland; an alignment ring disposed within the follower conduit to receive the shaft; and an emission containment gland disposed outboard the alignment ring, having a conduit to receive the shaft.

In yet another aspect, the present invention may be directed towards a method for containing emissions in a fluid system having a chamber housing with a conduit and a shaft with a surface, comprising the steps of providing a compression packing gland on the shaft, including a compression unit with an outboard surface disposed therein and having a conduit therethrough; inserting the compression packing gland within the chamber housing conduit; providing a follower on the shaft with a barrel and an inboard surface; inserting the follower barrel within at least a portion of the compression packing gland, the inboard surface of the alignment follower abutting the outboard surface of the compression unit; and providing an emission containment gland, having an arced vapor channel disposed in communication with the shaft.

The emission containment sealing and alignment apparatus and method for use in fluid systems, when compared with previously proposed prior art emission containment and alignment apparatus and methods, have the advantages of providing efficient and effective sealing and alignment of an emission containment gland on, for example, a pump shaft.

BRIEF DESCRIPTION OF THE DRAWING

In the drawing:

FIG. 4 is a front view of an embodiment of an emission containment gland of the present invention, showing an open-arc configuration;

FIG. 5 is a front view of an embodiment of an emission containment gland of the present invention, showing a ducted turbine closed-arc configuration;

FIG. 6 is a perspective view of a system utilizing an embodiment of the present invention;

FIG. 7 is a cross-sectional view of an embodiment of the present invention taken along line 7—7 of FIG. 6 used in connection with a pump;

Figure 1:
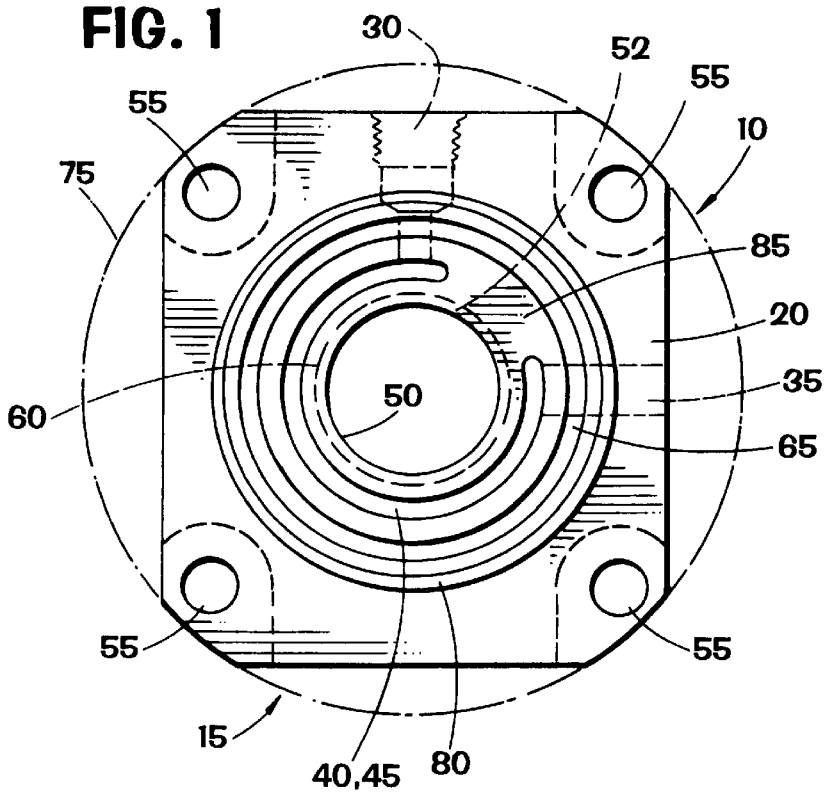
FIG. 1 is a front view of an embodiment of an emission containment gland of the present invention, showing a closed-arc configuration.
Figure 2:
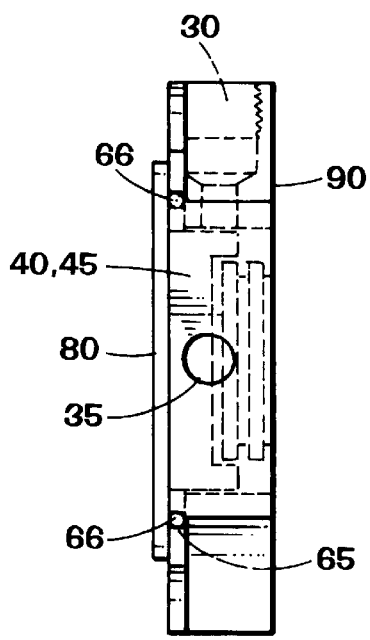
FIG. 2 is a side view of the embodiment of an emission containment system of FIG. 1 of the present invention.

While the invention may be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

The present invention is an emission containment and alignment apparatus for use primarily in fluid systems, such as pumps and valves. However, the present invention may be well suited for use in fluid service involving particulate solids, including applications involving airborne solids. The present invention may also be well suited for other applications where containment of particulates, vapors, or other fluids is desired; for example, contained mixing applications involving VOC's where a mixing shaft or rod must extend through an opening in the chamber or container where the mixing occurs. Further, it should be noted that embodiments of the present invention may preferably be used in systems as a secondary seal or containment device. However, embodiments of the present invention may also be used as a primary sealing or containment device. Further, certain embodiments of the present invention may be used to contain vapors or fluids within a system; other embodiments may be used to prevent contamination of the system from contaminants in the surrounding atmosphere; or both.

In a broad aspect, the present invention is directed to an improved containment and sealing method and apparatus for use in fluid systems. The method may be carried out in connection with the apparatus, and/or the method may be carried out in connection with other apparatus. Likewise, the apparatus may be utilized in connection with other methods. Various embodiments and aspects of the apparatus are shown in FIGS. 1–12, where like reference numerals refer to like parts.

With reference to FIGS. 1–3, 4 and 7, in one embodiment of the present invention is an emission containment device 10 for use in fluid systems which may comprise an emission containment gland 15, comprising a front face 20, a rear face 90, a vapor inlet 30, a vapor outlet 35, and a vapor channel 40 extending in an arced configuration in the front face 20 and connecting the vapor inlet 30 and the vapor outlet 35. As shown in FIGS. 1–5, fluid must flow along an arced or circular path in order to travel from vapor inlet 30 to vapor outlet 35 through arced vapor channel 40, 196, 197. Arced is meant to include circular or any other curved configuration. In a preferred embodiment, intended for use with pumps, the emission containment gland 15 may further comprise a cylindrical central bore 50 extending from the front face 20 to the rear face 90 and capable of receiving a pump shaft 100.

Figure 11:
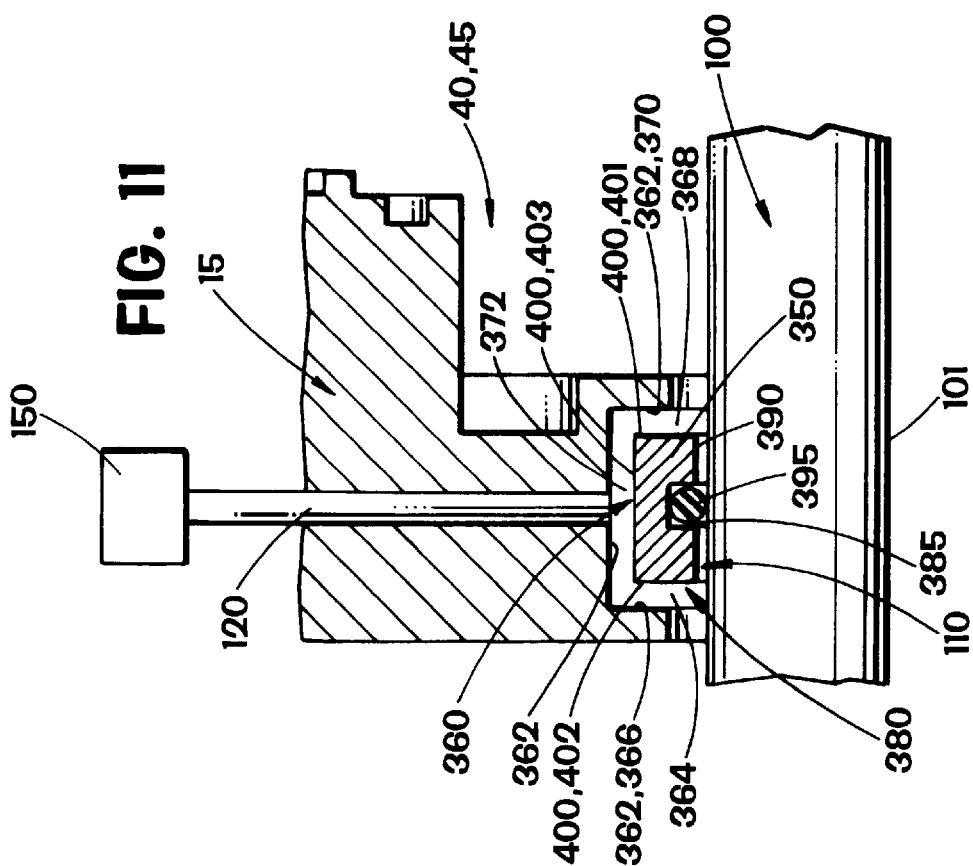
FIG. 11 is a partial cross-sectional side view of an emission containment gland sealing member, showing a floating shaft seal of the present invention.

Referring now to FIG. 7, in another embodiment of the present invention, which may be used with pumps, a cylindrical pump shaft 100, which may include a sealing member mounted on the shaft, extends through the central bore 50 of the emission containment gland 15. The sealing member 110 is mounted on the shaft 100 and positioned such that it is disposed proximate the rear face 90 of the emission containment gland 15, as shown in FIGS. 7–12. In one embodiment, the sealing member may comprise an O-ring lip seal 112 of the type sold under the trademark PolyPak™ by Parker Seal Group of Lexington, Ky., and may be disposed in sealing engagement with the shaft. The design of the sealing member 110, 112 in FIGS. 7–12 will depend upon the characteristics of the fluid system where the containment device 10 is installed, such as fluid chemistry, temperature, and pressure differential across the sealing member. In another embodiment, the containment device 10 may comprise two sealing members 110, a first second sealing member 111 or outboard sealing member 160, and a second sealing member 113, or inbound sealing member 170, may be mounted on or disposed in connection with the pump shaft 100. In this embodiment, as shown in FIGS. 10 and 11, a fluid injection channel 120 may extend through the emission containment gland 15 such that the volume between the two sealing members 111, 113 can be pressurized whenever pressurized fluid is injected into the fluid injection channel 120.

Figure 3:
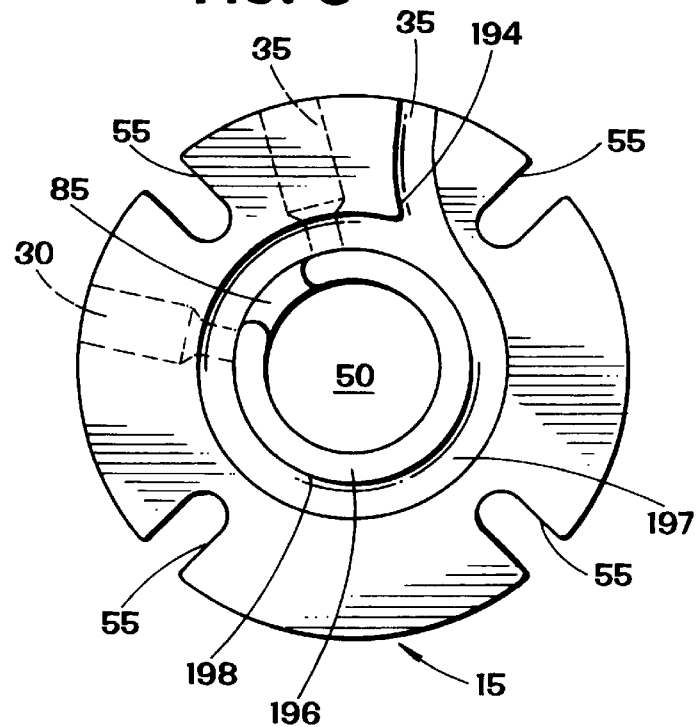
FIG. 3 is a front view of an embodiment of an emission containment gland of the present invention, showing a combination open-arc and closed-arc configuration.

As shown in FIGS. 1–5, in a preferred embodiment, the vapor channel 40 may extend in an arced configuration around the central bore 50. It may be desirable in an embodiment of the present invention to have an arced configuration of less than 360° so that the entire length of the arced configuration will be subject to the suction produced by the suction manifold, and to ensure fluid flow in the direction of rotation of the shaft. Accordingly, the arc of the vapor channel 40 may be greater than 270° and less than 360°, as shown in FIG. 1. However, as shown in FIGS. 3, 5 and 9, an embodiment may also include an arced configuration of 360°, as will be described further herein. In the preferred embodiment, a circular groove 65 may lie in the front face 20 surrounding the arced configuration of the vapor channel 40. This circular groove 65 may be capable of receiving an O-ring 66.

The emission containment gland 15 is intended for mechanical attachment to a fluid system. In a preferred embodiment, the emission containment gland 15 may comprise at least one, and preferably two or more, bolt channels 55 extending from the front face 20 to the rear face 90 of the emission containment gland 15 near its outer periphery 75, as shown in FIG. 1. In a preferred embodiment, the emission containment gland 15 may further comprise a raised circular ridge 80 in the front face 20 surrounding the circular groove 65. This raised ridge 80 or pilot 80 may be used to position the emission containment gland 15 on the fluid system component 480 (shown in FIGS. 4–9, 12) to which it is attached. However, other means may be utilized to position the emission containment gland 15.

Referring again to FIG. 7, the emission containment device 10 of the present invention may further comprise a suction manifold 250 attached to the emission containment gland 15. The suction manifold 250 may comprise a suction channel 270 in fluid communication with the vapor outlet 35 of the emission containment gland 15. The suction manifold 250 may further comprise a fluid injection channel 260 having a first end 262 attachable to a fluid container 232 (shown in FIG. 6) and a second end 264 intersecting a suction channel 270. In one embodiment, the fluid injection channel 260 may intersect the suction channel 270 at a substantially perpendicular angle. However, the fluid injection channel 260 may also intersect channel 270 at other angles. The suction manifold may further comprise a suction nozzle bore 280 in alignment with the suction channel 270 and extending to the outer periphery 290 of the suction manifold 250.

Still with reference to FIG. 7, the emission containment device 10 of the present invention may further comprise a suction nozzle 320 comprising a suction end 322, a discharge end 324, a tapered flow region 326, and a flow channel 328 extending longitudinally through the suction nozzle 320. The suction nozzle 320 may be adjustably insertable in the bore 280 to extend into the intersection of the suction channel 270 and the fluid injection channel 260 such that the flow channel 328 is in fluid communication with the suction channel 270 and the fluid injection channel 260. When fluid flows into the suction end 322, through the tapered flow region 326, and to the discharge end 324 of the suction nozzle 320, a venturi effect results. The suction nozzle 320 is capable of producing a suction on the combination of fluids and/or contaminants entering through fluid injection channel 260 and suction channel 270, regardless of the liquid/gas/solid content of each fluid and independent of the spatial orientation of the suction manifold 250. In a preferred embodiment, the suction nozzle bore 280 may comprise female threads 291 and the suction nozzle 320 may comprise male threads 292 that threadably engage the female threads 291 of the bore 280. In a preferred embodiment, an O-ring groove 330 may extend circumferentially around the suction nozzle 320 and an O-ring 332 may be inserted in the O-ring groove 330.

Referring now to FIG. 6, the containment device 10 of the present invention may further comprise a fluid injection recirculation line 200. The fluid injection recirculation line 200 may comprise a first end 202 attached to the discharge end 324 of the suction nozzle 320 and a second end 204 attached to the first end 202 of the fluid injection channel 200. A balance line 200 may extend from the first end 202 of the fluid injection recirculation line 200 to the vapor inlet 30 of the emission containment gland 15 to provide a source of fluid to the vapor channel 40 (shown in FIG. 1) that can be sucked into the suction manifold 250, thus removing any contaminants that may be present in the vapor channel 40.

Now with reference to FIGS. 6 and 7, in another aspect, containment device of the present invention may be directed toward an emissions containment and recirculation system 249. This system 249 of the present invention includes an emission containment gland 15, a suction manifold 250, a suction nozzle 320, and a fluid injection recirculation line 200, as discussed above. The system 249 may further comprise a pressurized fluid delivery system 230 comprising a container of pressurized fluid 232 connected to a discharge line 233. The discharge line is connected to the fluid injection channel 260 such that a valve 235 can be opened and closed to control the flow of pressurized fluid from the container 232 into the fluid injection channel 260. In a preferred embodiment, the pressurized fluid may be nitrogen, and it may be injected at a constant pressure of at least 35 psig, supplied by compressor 234.

The system 249 may further comprise a liquid separator 236 or collection tank 237 installed in the fluid injection recirculation line 200 and capable of collecting liquid that may flow through the fluid injection recirculation line 200. In an alternative embodiment, a chiller unit 238 may be used instead of a liquid separator 236 or collection tank 237. The chiller unit 238 may be capable of condensing moisture entrained in the fluid that flows through the fluid injection recirculation line 200. The system 249 may further comprise a filter 240 installed in the recirculation line 200 downstream from the liquid collection tank 237. In a preferred embodiment, the filter 240 may be a carbon filter. The system 249 may further include an exhaust gas collection tank 242 installed in the fluid injection recirculation line 200 downstream from the filter 240. In this embodiment, the containment device 10 of the present invention functions as an emission containment and recovery system. The exhaust gas collection tank 242 may collect VOC's and other gases and store those gases for later controlled disposal or processing. An exhaust vent line 246 may be installed in the top of the exhaust gas collection tank 242. The exhaust vent line 246 may contain a valve to permit the selective venting of the exhaust gas collection tank 242, such as by flaring.

The containment device 10 of the present invention may be used as either a primary or secondary containment system used to capture vapor and/or liquid leakage escaping from a host seal and to deposit the emissions to a disposal device or to deliver them to a specified collection point. However, the present invention may also be used as a secondary containment device in the event primary sealing or containment should fail.

Referring again to FIGS. 1–4, in one embodiment, the emission containment gland 15 may be provided with a closed-arc configuration as described above, having a block 85 or arc barrier 85 in the annulus 45 of the emission containment gland 15 so that air movement provided by the suction manifold (shown in FIGS. 6–7), exhaust piping 220 (shown in FIGS. 6–7), and balance line 210 (shown in FIGS. 6–7) is provided as a jet stream, which may operate at sonic velocities, traveling circumferentially in the direction of rotation of the rod 100 or shaft 100 disposed therethrough (shown in FIGS. 4–5). However, it should be noted that in a particular application it may be desirable that the jet stream flow in a direction counter to the rotation of the shaft 100. Referring now to FIG. 7, the jet stream may create both a negative pressure portion 310 and positive pressure portion 300 in the interior of the suction manifold 250, or vacuum jet 250. Liquid and/or vapor molecules in the emission containment gland 15, the vacuum jet 250, and all attached lines are affected by the jet stream 250. The negative pressure portion 310 of the vacuum jet 250 may be attached to the emission containment gland 15. The positive pressure portion 300 may be attached to the exhaust piping 220 (shown in FIG. 6). Referring again to FIGS. 1–5, in operation, the jet stream traveling circumferentially along the walls of the emission containment gland annulus 45, 196, 197 may provide a vapor barrier, blocking emissions that may travel along the shaft 100 extending through the system. However, the jet stream may also cause such emissions to be captured and carried in the jet stream through the annulus 45, 196, 197 and carried out the vapor outlet 35 for further containment or disposal. In such an embodiment, the closed-arc 196 provides only one path for the jet stream to follow, thereby assuring that emissions will be carried through the device 10. However, in another embodiment, for example, when the present invention is utilized in connection with a rotary shaft 100, an open-arc configuration may be utilized.

FIGS. 3, 5 and 9 show embodiments having an open-arced configuration. In an open-arced embodiment of the containment device 10 of the present invention, a series of one or more fins 190, or blades 190, disposed along the surface 101 of the shaft 100 within the annulus 45 of the emission containment gland 15 of the containment device 10 of the present invention, may provide the jet stream. The blades 190 may be fixedly attached to the shaft 100 by the use of set screws 192, and may be oriented such that, as the shaft 100 rotates, the blades 190 create a fluid flow in the annulus 45, 197 in the direction of rotation of the shaft 100. A duct 194 may be provided along the annulus 45, 197 to direct the fluid flow into the vapor outlet 35 so that it may be removed from the system and either stored or disposed of as in the closed-arc embodiment of the present invention. The open-arc embodiment of the containment device 10 of the present invention may be used alone or in combination with a suction manifold 250, or vacuum jet 250.

Referring now to FIG. 3, in another embodiment, an emission containment gland 15 of the present invention may include multiple annulus stages 196, 197, or configurations. For example, a closed-arc annulus 196 may be provided in series with an open-arc annulus 198. In a multiple annulus embodiment, a sealing member (not shown) may be provided between the closed-arc annulus 196 and the open-arc annulus 198. Further, a single annulus 45 may be provided, having a transition portion 198 between a closed-arc and an open-arc configuration.

Referring now to FIGS. 10–11, in another aspect, the present invention may be directed toward a sealing device 110, or sealing member 110, provided along the shaft 100. In one embodiment (shown in FIG. 10), tandem shaft lip seals 130, are provided, seals 130 preferably having a general U-shaped Cup construction. The seals 130 may be lightly loaded along the shaft 100 to minimize any frictional wear. However, in the event of frictional wear, a small clearance 140 along the shaft 100 may result. The seals 130 may be energized by a gas power source 150, which may be a source of fluid pressure injected through a gas injection channel 120 drilled in the emission containment gland 15 between the tandem seals 130 to create a positive seal along the shaft 100. Further, the gas pressure may form a gas barrier, assisting in containment of any emissions or preventing contamination from the environment. The outboard shaft seal 160 may control the amount of loss of the injection gas to the atmosphere and may be a pressure-activated backup to the inboard shaft seal 170. During normal operation, the inside diameter lip 172 of the inboard shaft seal may ride on a thin layer of gas 180 created by the injected gas pressure between the lip 172 and the shaft 100. This may limit frictional wear along the lip 172 of the inboard seal 170 and may create a reliable low pressure seal along the shaft 100. In the event of a host seal (for example, a primary seal, which may be a containment device 10 in accordance with the present invention) failure, the inboard shaft seal 170 may be energized as the pressure increases as a result of the host seal (not shown) failure. Upon such failure of the host seal (not shown), the pressure acting on the inboard shaft seal 170 may further energize the seal 110, forcing the inside diameter lip 172 of the inboard shaft seal 170 against the shaft 100 and providing a positive seal along the shaft 100. However, it may be found that in a particular application, the frictional wear of the tandem lip seals 130 may not be desirable.

In another embodiment of the containment device 10 of the present invention, shown in FIG. 11, the sealing member 110 may comprise a floating shaft seal 350. In such an embodiment, a seal chamber 360 is provided along the inside diameter of a conduit 50 of the emission containment gland 15, which may or may not have an arced vapor channel 40, 45. A solid seal ring 380 is disposed within the seal chamber 360, having a floating shaft seal groove 385 along the inside diameter wall 390 of the solid seal ring 380. An O-ring 395 may be placed in the floating shaft seal groove 385. The seal chamber 360 may be designed to fit closely along the inboard seal face 401 of the seal ring 380, the outboard seal face 402 of the seal ring 380, and outside diameter seal face 403 of the seal ring 380. However, sufficient tolerance may be provided between the floating shaft seal 350 and the seal chamber walls 362 to prevent contact during normal operation of the fluid system.

The O-ring 395 provided in the floating shaft seal groove 385 may be a shaft seal driver ring 395. The shaft seal driver ring 395 provides a positive seal between the floating shaft seal 350 and the shaft 100. The driver ring 395 may prevent rotation of the seal ring 380 with respect to shaft 100, the seal ring 380 being driven to rotate along with the rotation of the shaft 100. However, the driver ring 395 may also act as a roller, or bearing, allowing the floating shaft seal ring 380 to move, or float axially along the shaft. An outboard float space 364 may be provided between the outboard seal chamber side wall and the outboard seal face 402. Similarly, an inboard float space 368 may be provided between the inboard seal chamber side wall 370 and the inboard seal face 401. Similarly, a radial float space 372 may be provided between the outside diameter seal face 403 of the seal ring 380 and the seal chamber annular wall 374. During normal operation, gas may be injected under pressure through the gas injection channel 120 into the outboard float space 364, the inboard float space 368, and the radial float space 372 in fluid communication with the seal chamber 360, the outboard seal chamber side wall 366, the inboard seal chamber side wall 370, the seal chamber annular wall 374, and the shaft surface 101. A positive seal may be provided by the gas trapped between the seal ring faces 400 and the seal chamber walls 362. The seal ring 380 may float to the hydraulic center of the seal chamber 360, having little to no contact along the seal chamber walls 362. If hydraulic pressure enters into the seal chamber 360 from either direction, such as resulting from failure of a primary, or host, seal, the seal ring 380 may slide along the shaft 100 and create a positive face seal along the seal chamber wall 362, 366, 370 opposite the hydraulic pressure. Once the hydraulic pressure is relieved the seal ring 380 may tend to return to the hydraulic center of the seal chamber 360.

Figure 8:
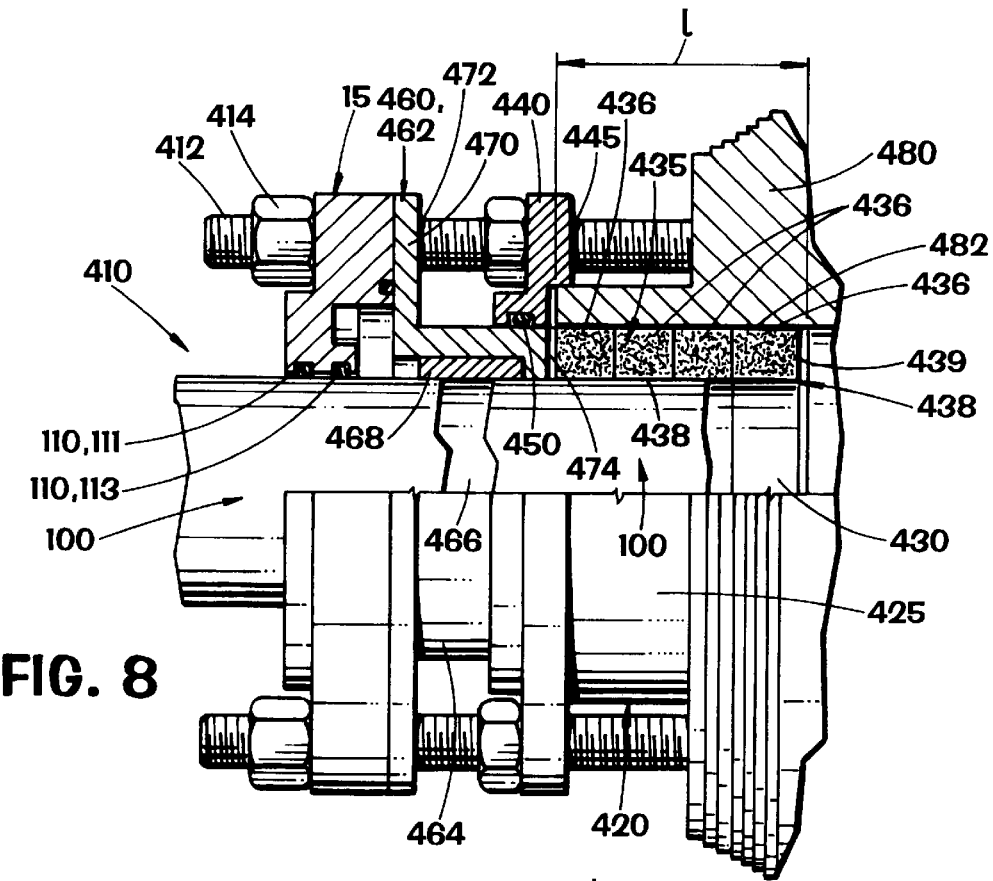
FIG. 8 is a partial cross-sectional side view of a packed cartridge system of the present invention.
Figure 9:
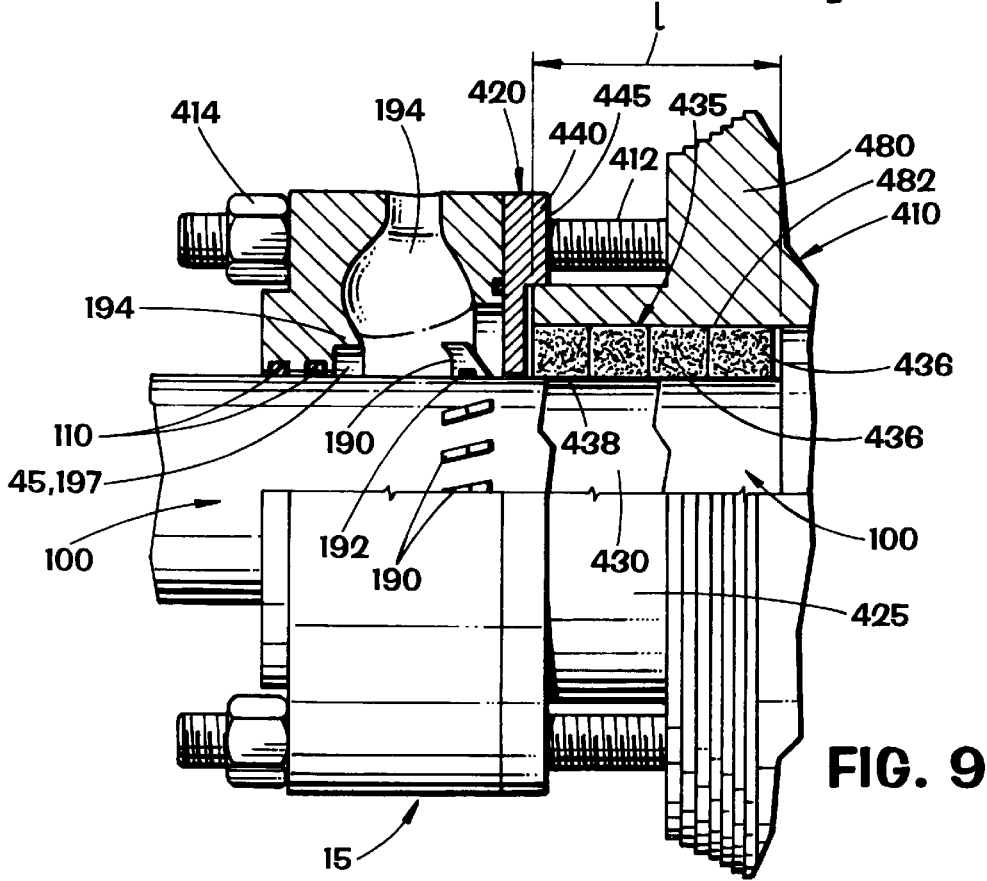
FIG. 9 is a partial cross-sectional side view of an embodiment of the present invention, showing a ducted turbine emission containment gland and a compression packing housing gland.
Figure 10:
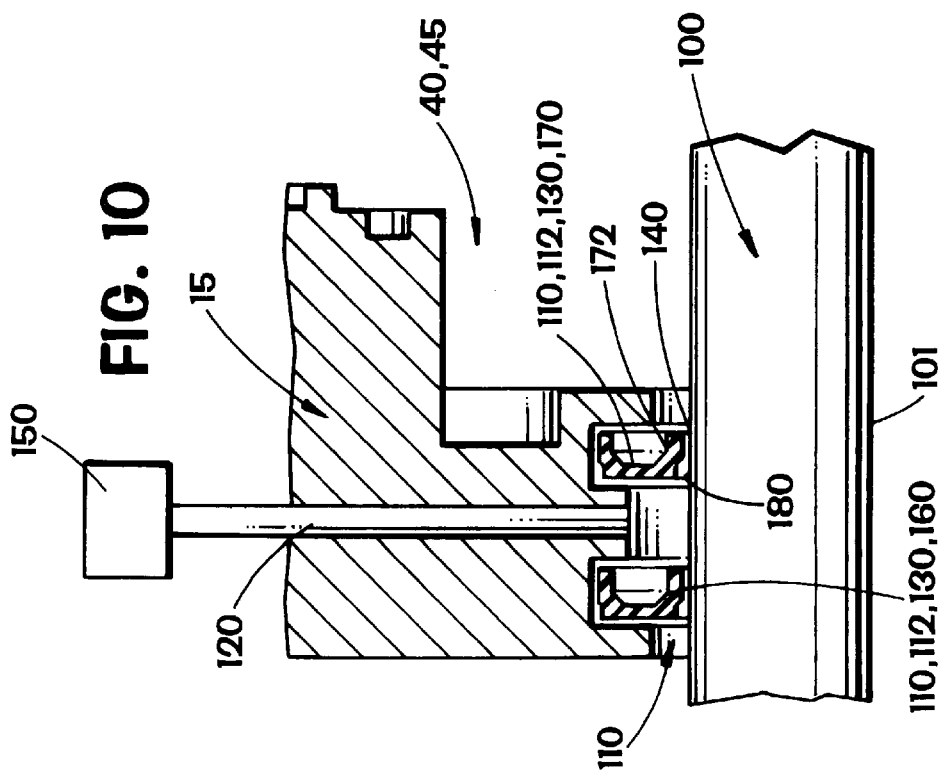
FIG. 10 is a partial cross-sectional side view of an emission containment gland sealing member, showing tandem lip seals in normal operation.
Figure 12:
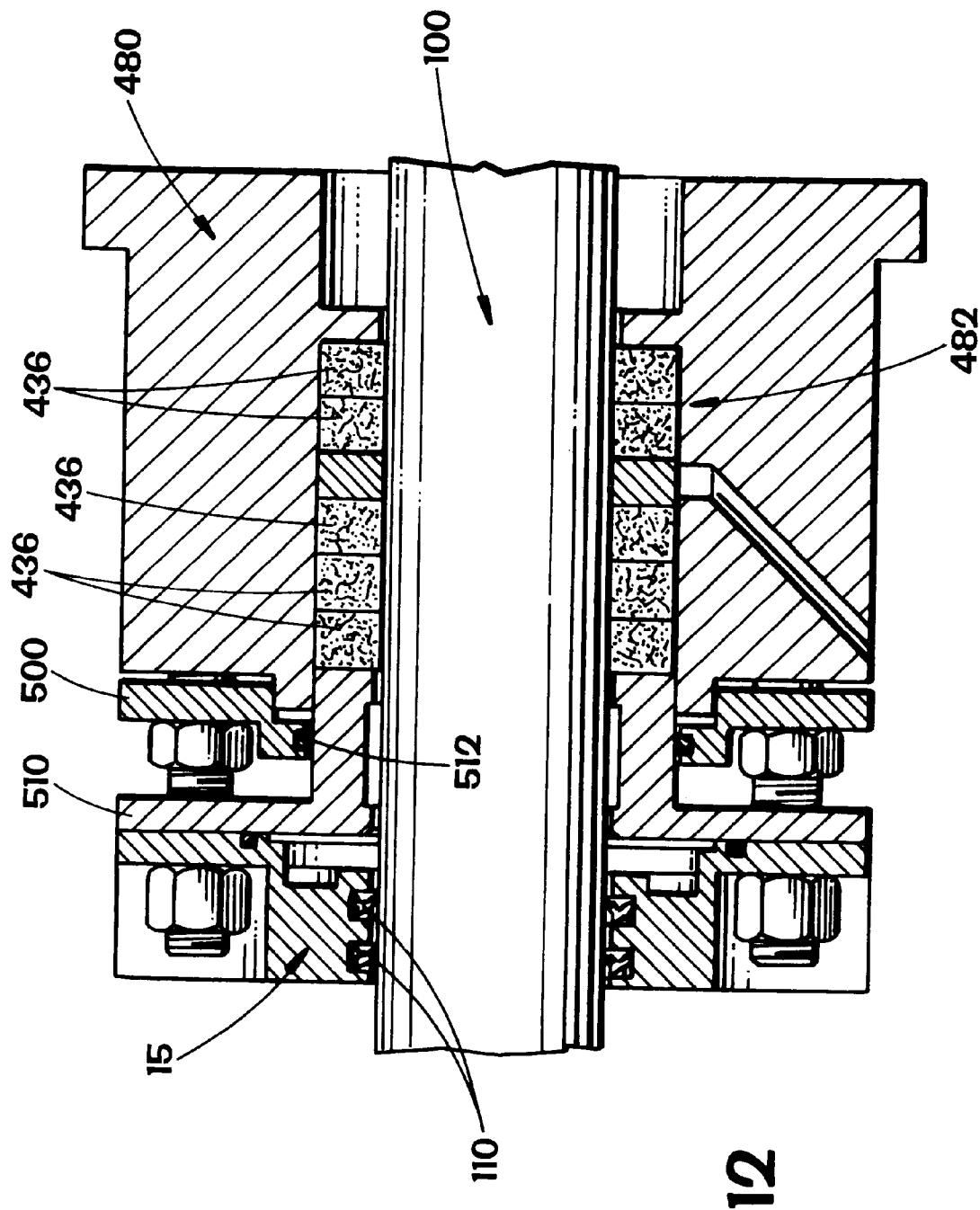
FIG. 12 is a cross-sectional side view of an embodiment of an embodiment of the present invention, showing an emission containment gland used with traditional packing, a packing follower, and an adapter ring.

Turning now to FIGS. 8 and 9, in another aspect of the present invention, a packed cartridge system 410 may comprise a packing follower 460, 510, a compression packing housing gland 420, an alignment ring 468, compression packing 435, 436, and an emission containment gland 15. The compression packing housing gland 420 may be configured to be disposed, for example, within a pump chamber housing 480. The compression packing housing gland 420 may be comprised of a cartridge barrel 425, being formed to fit within a stuffing box 482 of a pump chamber housing 480, the housing gland 420 having a conduit 430 therethrough which receives, for example, a pump shaft 100. The inside diameter of the cartridge barrel 425 may be selected to provide sufficient space to receive compression packing. 435, 436. Prior to inserting the housing gland 15 into the stuffing box 482, a compression unit 435 of pre-selected compression packing 436 is provided in the conduit 435 having desired characteristics for a particular application. The inner surface 438 of the compression unit 435 may have a diameter substantially equal or greater than the outside diameter of the pump shaft 100. The housing gland 420 is disposed within the stuffing box 482, the shaft 100 extending through the conduit 430 of the housing gland 420, the compression unit 435 of compression packing 436 being provided, or disposed, between the cartridge barrel 425 and the shaft 100. The cartridge barrel 425 may have a length L substantially equal to the length L (not shown) of the stuffing box 482, the cartridge barrel 425 may have a shorter length L, or the cartridge barrel 425 may have a length L greater than the stuffing box 482. Where the cartridge barrel 425 length is longer than the stuffing box 482 length, a greater number of compression packing rings 436 may be used than would otherwise be possible without the use of a packed cartridge system 410. The compression packing housing gland 435 may also be comprised of a packing retaining flange 437. The packing retaining flange is preferably located on an inboard end 438 of the housing gland 435 and may have an inside diameter less than the compression unit outside diameter but greater than the shaft diameter. The retaining flange 439 provides a surface to retain the compression packing 436 in the event the compression packing 436 is compressed by, for example, a compression packing follower 510. The chamber housing may or may not have a stuffing box 482. Where the housing chamber 480 has no stuffing box 482, the housing gland 435 may function as a stuffing box 482, retaining the compression packing 436.

The housing gland 420 may further comprise a follower flange 440, which may be disposed outboard the compression packing 436, having one or more bolt holes 445 provided therethrough to be received on a follower bolt 412. The housing gland 420 may be used along, it may be used in combination with a traditional compression packing follower 510 (shown in FIG. 12), it may be used without a compression packing follower (as shown in FIG. 9), or it may be used with an alignment follower 460. An alignment follower 460, may comprise a gland 462 having a barrel 467 with a conduit 466 therethrough having a sufficient inside diameter to receive an alignment ring 468. The alignment ring 468 may be friction fit within the conduit or fit by some other method. The alignment follower 460 may further comprise a flange 470, having one or more bolt holes 472 provided therethrough to be received on a follower bolt 412.

The alignment follower 460 may be disposed outboard of a housing gland 420 with the alignment follower barrel 464 disposed within at least a portion of the compression packing housing gland 420. Where the alignment follower barrel 464 is disposed within the housing gland 420, a static sealing ring 450 may be provided along either the outside diameter of the alignment packing follower 460 or the inside diameter of the housing gland 420. Where the alignment follower 460 is also a packing follower 460, the inboard surface 474 of the alignment follower 460 abuts the outboard surface 437 of the compression unit 435. An emission containment gland 15 may be provided outboard both the housing gland 420 and the alignment gland 462. The follower bolt 412 may extend through the bolt holes 55, 445 of the housing gland 420, the alignment gland 462, and the emission containment gland 15. A follower nut 414 may be provided outboard the emission containment gland 15. As the follower nut 414 is tightened, the alignment follower 460 or packing follower 510 may compress the compression packing 435, 436 to provide a compression seal along the length of the shaft 100 disposed through the compression unit 435 or compression packing 436. The alignment ring 468 may prevent or reduce misalignment of the system as the follower nut 414 is tightened and may maintain such alignment should the shaft 100 move axially.

In operation, the packed cartridge system 410 may: provide a primary seal; reduce the velocity of contaminants; direct any contaminants that may escape along the surface 101 of the pump shaft 100; provide alignment of the system; and provide an emission containment device to remove such contaminants from the system, preventing or reducing release of VOC's or other contaminants into the atmosphere.

It is to be understood that the invention is not limited to the exact details of construction, operation, exact materials, or embodiments shown and described, as obvious modifications and equivalents will be apparent to one skilled in the art.

Accordingly, the invention is therefore to be limited only by the scope of the appended claims.

What is claimed is:

1. An emission containment device for use in a system having a chamber housing and a shaft with a surface, comprising:

a front face adapted to be disposed in communication with the chamber housing;
 a rear face, having a central bore with a periphery and adapted to have the shaft extending therethrough;
 a vapor outlet; and
 an arced vapor channel having an arc barrier disposed within the arced vapor channel and further disposed in fluid communication with the vapor outlet, the periphery of the central bore, and the shaft, whereby emissions initially traveling along the shaft surface thereafter tend to flow in one circumferential direction along an arced path toward and through the vapor outlet to be removed from the shaft surface.

2. The emission containment device of claim 1, further comprising a sealing member disposed in sealing engagement with the shaft outboard of the arced vapor channel.

3. The emission containment device of claim 1, further comprising a tandem lip seal disposed in sealing engagement with the shaft outboard of the arced vapor channel.

4. The emission containment device of claim 1, further comprising a floating shaft seal disposed in sealing engagement with the shaft outboard of the arced vapor channel.

5. The emission containment device of claim 1, including one or more blades adapted to be disposed along the surface of the shaft in fluid communication with the arced vapor channel and the vapor outlet.

6. The emission containment device of claim 1, including:

one or more blades adapted to be disposed along the surface of the shaft in fluid communication with the arced vapor channel and the vapor outlet; and
 a duct, disposed in communication with the arced vapor channel path and proximate the vapor outlet, whereby the fluid traveling along the arced, path will tend to flow through the vapor outlet.

7. The emission containment device of claim 1, including one or more blades adapted to be fixedly attached to the surface of the shaft in fluid communication with the arced vapor channel and the vapor outlet, whereby, as the shaft rotates, the blades create a fluid flow in the arced vapor channel.

8. The emission containment device of claim 1, further comprising one or more blades adapted to be disposed along the surface of the shaft in fluid communication with the arced vapor channel and the vapor outlet, and a suction manifold disposed in fluid communication with the vapor outlet.

9. The emission containment device of claim 1, further comprising:

a vapor inlet disposed in fluid communication with the arced vapor channel;
 a suction manifold attached to the vapor outlet and disposed in fluid communication with the arced vapor channel; and
 wherein the arc barrier is disposed along the arced vapor channel, intermediate the vapor inlet and the vapor outlet, whereby fluid traveling along the arced vapor channel tends to travel in one direction from the vapor inlet through the vapor outlet.

10. The emission containment device of claim 8, including a sealing member disposed in sealing engagement with the shaft outboard of the arced vapor channel.

11. The emission containment device of claim 8, including a floating shaft seal disposed in sealing engagement with the shaft outboard of the arced vapor channel.

12. The emission containment device of claim 8, including a tandem lip seal disposed in sealing engagement with the shaft outboard of the arced vapor channel.

13. An emission containment device for use in a fluid system having a shaft with a surface, comprising:
 a source of fluid pressure;
 an emission containment gland having a conduit therethrough adapted to receive the shaft, and defining an inside diameter, a seal chamber provided along the inside diameter, a gas injection channel disposed in the emission containment gland in fluid communication with the source of fluid pressure and the seal chamber, a vapor outlet, an arced vapor channel having an arc barrier disposed within the arced vapor channel and disposed in fluid communication with the vapor outlet, the conduit and the shaft, whereby emissions initially traveling along the shaft surface thereafter tend to flow in one circumferential direction along an arced path toward and through the vapor outlet to be removed from the shaft surface;
 a solid seal ring, having a seal groove, disposed within the seal chamber; and
 an O-ring disposed within the seal groove and in sealing engagement with the shaft.

14. An emission containment device for use in a fluid system having a chamber housing and a shaft with a surface, comprising:
 (a) a gland, having a gas injection channel therethrough, the gland including:
  (1) a front face disposed in communication with the chamber housing;
  (2) a rear face, having a conduit therethrough for receiving the shaft and defining an inside diameter and a periphery, and adapted to have the shaft extending therethrough;
  (3) a vapor outlet;
  (4) an arced vapor channel having an arc barrier disposed within the arced vapor channel and further disposed in fluid communication with the vapor outlet, the periphery of the conduit, and the shaft, whereby emissions initially traveling along the shaft surface thereafter tend to flow in one circumferential direction along an arced path toward and through the vapor outlet to be removed from the shaft surface; and
  (5) a seal chamber provided along the inside diameter of the conduit;
 (b) a source of fluid pressure in fluid communication with the gas injection channel;
 (c) a solid seal ring, having a seal groove, adapted to be disposed within the seal chambers; and
 (d) an O-ring disposed within the seal groove and adapted to be in sealing engagement with the shaft.

15. The emission containment device of claim 14, whereby the emissions initially traveling along the shaft thereafter tend to flow in one direction along the arced path toward and through the vapor outlet in response to a fluid flow created by one or more blades adapted to be disposed along the surface of the shaft in fluid communication with the arced vapor channel.

16. The emission containment device of claim 14, including:
 a vapor inlet disposed in fluid communication with the arced vapor channel and a source of fluid pressure;
 a suction manifold attached to the vapor outlet and disposed in fluid communication with the arced vapor channel; and
 wherein the arc barrier is disposed intermediate the vapor inlet and the vapor outlet, to assist the emissions initially traveling along the shaft surface in traveling in one circumferential direction from the vapor inlet, along the arced vapor channel, and through the vapor outlet.

17. An emission containment device for use in a system having a chamber housing and a shaft with a surface, comprising:
 (a) a gland, having a gas injection channel therethrough, the gland including:
  (1) a front face disposed in communication with the chamber housing;
  (2) a rear face, having a conduit therethrough for receiving the shaft and defining an inside diameter and a periphery, and adapted to have the shaft extending therethrough;
  (3) a vapor outlet;
  (4) an arced vapor channel having an arc barrier disposed within the arced vapor channel and further disposed in fluid communication with the vapor outlet, the periphery of the conduit, and the shaft, whereby emissions initially traveling along the shaft surface tend to flow in one circumferential direction along an arced path toward and through the vapor outlet to be removed from the shaft surface; and
  (5) a seal chamber provided along the inside diameter of the conduit;
 (b) a source of fluid pressure in fluid communication with the gas injection channel;
 (c) a solid seal ring, having a seal groove, adapted to be disposed within the seal chamber; and
 (d) a shaft seal driving ring disposed within the seal groove and in communication with the shaft.

18. The emission containment device of claim 17, including one or more blades adapted to be disposed along the surface of the shaft in fluid communication with the arced vapor channel, whereby the emissions initially traveling along the shaft surface thereafter tend to travel in one direction along the arced path toward and through the vapor outlet in response to a fluid flow created by the one or more blades.

19. The emission containment device of claim 17, including:
 a vapor inlet disposed in fluid communication with the arced vapor channel and a source of fluid pressure;
 a suction manifold attached to the vapor outlet and disposed in fluid communication with the arced vapor channel; and
 wherein the arc barrier is disposed intermediate the vapor inlet and the vapor outlet, to assist the emissions initially traveling along the shaft surface in traveling in one circumferential direction from the vapor inlet, along the arced vapor channel, and through the vapor outlet.

* * * * *